United States Patent [19]

Kobayashi et al.

[11] Patent Number: 5,024,201
[45] Date of Patent: Jun. 18, 1991

[54] ASSIST AIR SUPPLY SYSTEM FOR INTERNAL COMBUSTION ENGINE

[75] Inventors: Kazumitsu Kobayashi; Hiroki Sunou, both of Gunma, Japan

[73] Assignee: Japan Electronic Control Systems Co., Ltd., Isezaki, Japan

[21] Appl. No.: 399,875

[22] Filed: Aug. 29, 1989

[30] Foreign Application Priority Data

Aug. 29, 1988 [JP] Japan .................. 63-214644

[51] Int. Cl.⁵ .............................. F02M 39/00
[52] U.S. Cl. ................. 123/531; 123/585
[58] Field of Search ............. 123/531, 532, 533, 534, 123/585

[56] References Cited

U.S. PATENT DOCUMENTS

| | | | |
|---|---|---|---|
| 4,159,703 | 7/1979 | Mayer | 123/531 |
| 4,465,050 | 8/1984 | Igashira et al. | 123/533 |
| 4,754,740 | 7/1988 | Emmenthal et al. | 123/531 |
| 4,756,293 | 7/1988 | Suzuki et al. | 123/531 |
| 4,782,809 | 11/1988 | Kotowski et al. | 123/531 |
| 4,841,942 | 6/1989 | McKay | 123/531 |

FOREIGN PATENT DOCUMENTS

0057407A2 8/1982 European Pat. Off. .
949666 2/1964 United Kingdom .

*Primary Examiner*—Andrew M. Dolinar
*Assistant Examiner*—M. Macy
*Attorney, Agent, or Firm*—Foley & Lardner

[57] ABSTRACT

An assist air supply system employs a pressurized air source which is formed separately from an induction system of an automotive internal combustion engine. The pressurized air source is connected to an induction system in the vicinity of a fuel injection valve so as to inject pressurized air in the vicinity of fuel injected through the fuel injection valve. A valve means is disposed between the pressurized air source and discharge of a pressurized air passage, so that the pressurized air can be injected or discharged in synchronism with injection timing of the fuel injection valve.

20 Claims, 3 Drawing Sheets

ASSIST AIR SUPPLY SYSTEM FOR INTERNAL COMBUSTION ENGINE

BACKGROUND OF THE INVENTION

1. Field of the Invention

The present invention relates generally to an assist air supply system for assisting atomization of fuel injected through a fuel injection valve in an automotive internal combustion engine. More specifically, the invention relates to an assist air supply system which is designed for injecting pressurized air in the vicinity of fuel injected through the fuel injection valve in order to promote forming uniform fuel content air/fuel mixture and for providing better fuel combustion efficiency.

2. Description of the Background Art

In the recent years, there have been developed and proposed assist air supply systems for supplying an assist air in the vicinity of fuel injection valves for prompting atomization of injected fuel to aid in establishing uniform fuel distribution in an air/fuel mixture and in providing high combustion efficiency of fuel. In the conventionally proposed assist air supply system, the assist air is introduced from the air induction passage upstream of a throttle valve utilizing pressure difference between the upstream side and downstream side of the throttle valve.

Such prior proposed system encountered problems in providing uniformity of assist air pressure. Namely, as will be appreciated, the pressure difference between the upstream and the downstream of the throttle valve is reduced according to increases in the throttle valve open angle. This means that the assist air pressure at high engine speed and high engine load condition becomes insufficient for promoting atomization of fuel.

SUMMARY OF THE INVENTION

Therefore, it is an object of the present invention to provide an assist air supply system which is effective at all engine driving ranges and assures the atomization assisting effect at any engine driving condition.

In order to accomplish the aforementioned and other objects, an assist air supply system, according to the present invention, employs a pressurized air source which is formed separately from an induction system of an automotive internal combustion engine. The pressurized air source is connected to an induction system in the vicinity of a fuel injection valve, so as to inject pressurized air in the vicinity of fuel injected through the fuel injection valve. A valve means is disposed between the pressurized air source and discharge of a pressurized air passage so that the pressurized air can be injected or discharged in synchronism with injection timing of the fuel injection valve.

According to one aspect of the invention, an assist air supply system for a fuel injection internal combustion engine includes:

an assist air discharge nozzle provided for discharging a pressurized air in the vicinity of a fuel injected through a fuel injection valve; and a pressurized air supply means including means associated with an external driving power source to be driven by the driving force supplied therefrom, for generating a pressurized air having a pressure level higher than or equal to a predetermined level, and supplying a pressurized air to the assist air discharge nozzle in synchronism with fuel injection.

In the preferred embodiment, the assist air supply system may further have sensor means for monitoring preselected engine driving parameters affecting fuel injection amount and producing sensor signals representative of the monitored engine driving parameters; and controlling means for receiving the sensor signals and determining assist air supply timing on the basis of the sensor signals, so that the assist air is discharged in synchronism with fuel injection timing. Furthermore, the assist air supply system may further have a valve means disposed between the assist air discharge nozzle and the pressurized air source means for selectively establishing and blocking pressurized air communication between the pressurized air source means and the assist air discharge nozzle. In such case, the controlling means receives the sensor signals and determining assist air supply timing on the basis of the sensor signals, the controlling means outputting an assist air control signal to the valve means for controlling valve position, so that the assist air is discharged in synchronism with fuel injection.

In the preferred process, the controlling means derives a duration to maintain the valve means at open position on the basis of the sensor signals. Further, the controlling means sets the duration to maintain the valve means at open position at a magnitude corresponding to a duration, in which the fuel injection valve stays open. The controlling means may set a timing of opening the valve means so that the valve means opens at earlier timing that open timing of the fuel injection valve, at a predetermined magnitude. The controlling means may set the predetermined magnitude so as to compensate lag time from a timing of opening of the valve means to a timing of discharging assist air.

The assist air supply system may further have means for monitoring pressure level of the assist air to be supplied to the assist air discharge nozzle for producing an assist air pressure indicative signal. The controlling means is responsive to the assist air pressure indicative signal for controlling operation of the pressurized air source means so that the assist air pressure is maintained higher than or equal to a predetermined pressure criterion. The controlling means may be set the predetermined pressure criterion at a pressure level slightly lower than a fuel pressure level to be supplied to the fuel injection valve.

In the preferred construction, the pressurized air source means has an engine powered air pump connected to an engine output shaft via an electromagnetic clutch means which selectively engages and disengages for driving and stopping the pump, and the controlling means which controls the electromagnetic clutch at the engaged state when the pressure level of the assist air to be supplied to the assist air discharge nozzle is lower that a predetermined pressure criterion. The assist air supply system may further have means for defining an air chamber surrounding a discharge outlet of the fuel injection valve. The assist air supply nozzle is inserted into the air chamber to discharge pressurized assist air into the air chamber for generating swirl flow of atomized fuel and pressurized air to be introduced into a combustion chamber of the engine.

According to another aspect of the invention, an assist air supply system for a fuel injection internal combustion engine includes:

an assist air discharge nozzle provided for discharging a pressurized air in the vicinity of a fuel injected through a fuel injection valve;

a pressurized air source means including a pump means for generating a pressurized air at a level of pressure higher than or equal to a predetermined level, and supplying a pressurized air to the assist air discharge nozzle;

a valve means disposed between the assist air discharge nozzle and the pressurized air source means for selectively establishing and blocking pressurized air communication between the pressurized air source means and the assist air discharge nozzle;

sensor means for monitoring preselected engine driving parameters affecting fuel injection amount and producing sensor signals representative of the monitored engine driving parameters; and controlling means for receiving the sensor signals and determining assist air supply timing on the basis of the sensor signals, the controlling means outputting an assist air control signal to the valve means for controlling valve position so that the assist air is discharged in synchronism with fuel injection.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
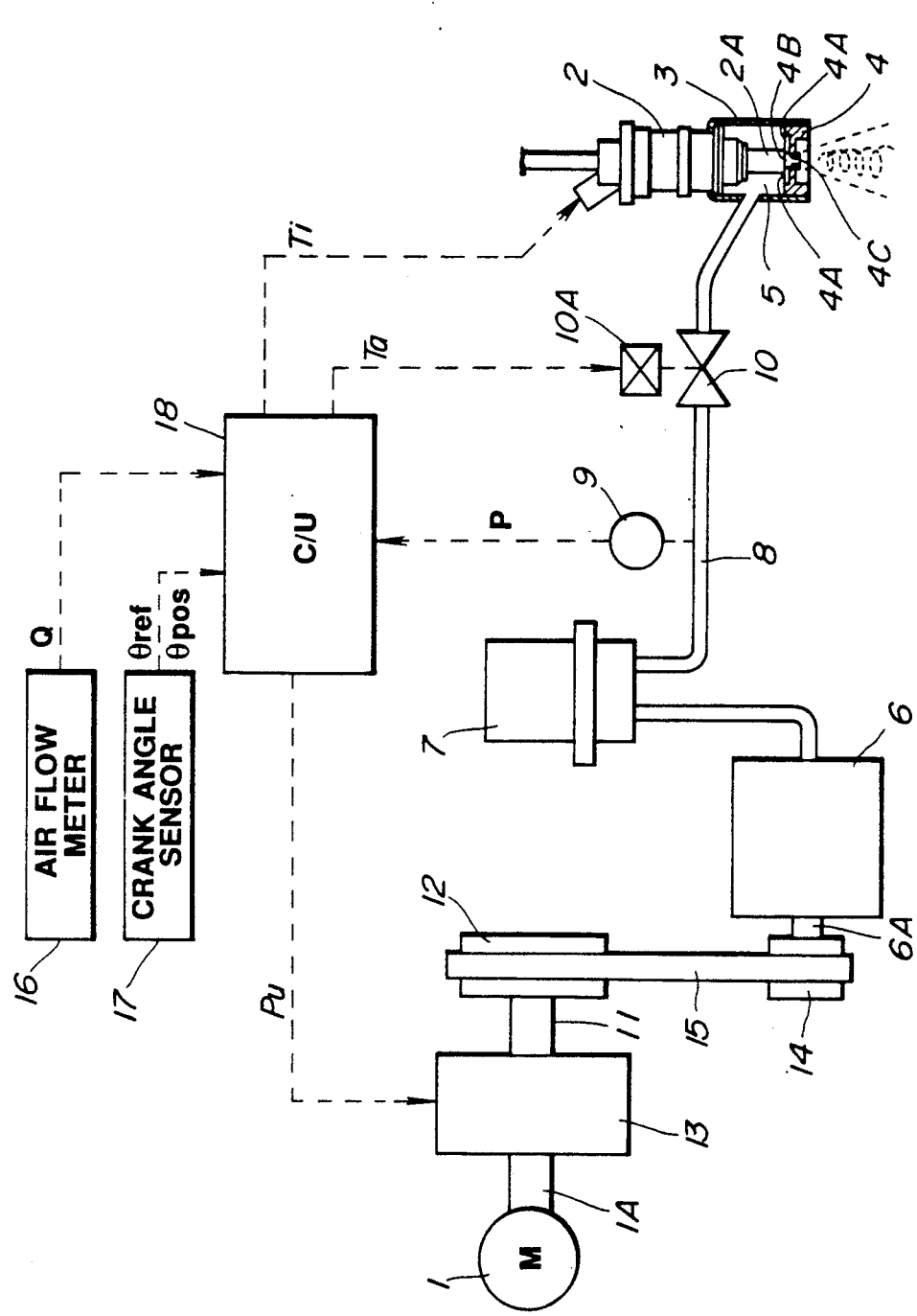
FIG. 1 is a block diagram of the preferred embodiment of an assist air supply system according to the present invention.

Referring now to the drawings, particularly to FIG. 1, the preferred embodiment of an assist air supply system, according to the present invention, is applicable for a fuel injection type automotive internal combustion engine which is represented by the reference numeral 1. The engine 1 has an air induction system (not shown). One or more fuel injection valves 2 (of which one is shown) is inserted into the air induction system for injecting a controlled amount of fuel into the air induction system at a controlled timing. The fuel injection valve 2 has an injection nozzle 2A oriented within an intake air flow in the air induction system so that fuel is injected therethrough. An essentially cylindrical cover 3 is provided to surround the injection nozzle 2A. The end of the cylindrical cover 3 is closed by an end closure 4 to define an air chamber 5. The end closure 4 defines a swirl chamber 4B which is in communication with the air chamber 5 via tangentially defined paths 4A. The swirl chamber 4B is formed into a conical shape configuration for reducing diameter toward a discharge outlet 4C so as to generate swirl flow of injected fuel and discharged air.

In order to discharge or inject pressurized air into the air chamber 5, a pressurized air path 8 connecting a pressurized air source and a discharge outlet opening to the air chamber, is provided. The pressurized air source comprises an air pump 6 and a pressure accumulator 7. The air pump 6 has a drive shaft 6A, to which a driven pulley 14 is rigidly fixed. The driven pulley 14 is drivingly connected to a driving pulley 12 via a drive belt 15. The driving pulley 12 has a shaft releasably coupled with an output shaft 1A of the engine 1 via an electromagnetic clutch 13. On the other hand, in order to control discharge of the pressurized air through the discharge outlet of the pressurized air path 8, an assist air control valve 10 is interposed within the pressurized air path 8. The assist air control valve 10 is associated with an electromagnetic actuator 10A for electromagnetically driving the valve between a closed position and an open position.

A control unit 18 is connected to the electromagnetic clutch 13 and the electromagnetic actuator 10A for controlling the clutch and the actuator. The control unit 18 is also connected to an air flow meter 16 and a crank angle sensor 17. The air flow meter 16 is disposed within the air induction system and monitors intake air flow rate for producing an air flow rate indicative signal Q. On the other hand, the crank angle sensor 17 is provided in association with a crankshaft for producing a crank reference signal $\theta_{ref}$ at every predetermined angular position of the crankshaft, e.g. 70° before top-dead-center (BTDC) and a crank position signal $\theta_{pos}$ at every predetermined angular displacement of the crankshaft, e.g. 1°. In the alternative, the crank angle sensor can be disposed within a power distributor of a spark ignition system for detecting the crankshaft angular position by monitoring rotor shaft position of a rotor in the distributor, since the angular position of the rotor shaft corresponds to the angular position of the crankshaft. In addition, the control unit 18 is connected to a pressure sensor 9 which is disposed within the pressurized air stream downstream of the pressure accumulator 7. The pressure sensor 9 is adapted to monitor the air pressure in the pressurized air path 8 downstream of the accumulator and produces an air pressure indicative signal P.

The control unit 18 may also be connected to other sensors monitoring additional parameter data for controlling fuel injection.

The control unit 18 derives fuel injection control signal Ti on the basis of various preselected fuel injection control parameters, including the air flow rate indicative signal Q and an engine revolution speed N, which is derived from the crank reference signal $\theta_{ref}$ or the crank position signal $\theta_{pos}$. In general, the basic fuel injection amount Tp is derived on the basis of the air flow rate indicative signal Q and the engine revolution speed N and is modified by correction values derived on the basis of the preselected correction parameters. These processes are known in the art and it is not necessary to discuss them in further detail.

The control unit 18 derives a basic fuel injection amount Tp on the basis of the engine speed N and an engine load, as represented by the intake air flow rate Q. Though the shown embodiment utilizes the intake air flow rate Q as the engine load representative data, it may be possible to employ other parameters, such as intake vacuum pressure, a throttle valve open angle and so forth, as the engine load representative parameter. The basic fuel injection amount Tp is arithmetically calculated from:

$$Tp = K \times Q/N$$

where K is a constant.

The basic fuel injection amount Tp is modified or corrected according to various correction factors, such as an air/fuel ratio dependent feedback correction coefficient, an engine coolant temperature dependent correction coefficient, acceleration and deceleration state dependent correction coefficient and so forth. Furthermore, modern fuel injection control, further employs a correction coefficient derived through learning by collecting and processing the engine driving condition data and parameter data. Fuel injection control employing a learning correction has been disclosed in co-pending U.S. patent application Ser. Nos. 197,847, 171,022 and 197,843, respectively filed on May 24, 1988, Mar. 18, 1988 and May 24, 1988, all of which have been assigned to the common owner of the present invention. The disclosure of these co-pending U.S. patent applications are herein incorporated by reference for the sake of disclosure.

Correction of the basic fuel injection amount Tp is generally performed by the following equation:

$$Ti = Tp \times \alpha \times \alpha' \times Coef \times Ts$$

where $\alpha$ is the air/fuel ratio dependent feedback correction coefficient $\alpha'$ is a learning correction coefficient Coef is representation of various other correction coefficients, such as an acceleration enrichment correction coefficient, a cold engine correction coefficient and so forth and Ts is a vehicular battery voltage compensating correction value.

The foregoing process in deriving the fuel injection amount Ti is not essential to the present invention. Therefore, the foregoing discussion concerning the process of deriving of the fuel injection amount Ti is to be appreciated as a mere example of a typical process for facilitating better understanding of the invention. The control unit 18 further produces a pump control signal Pu for a position of the electromagnetic clutch 13 between an engaged position and a released position depending upon the air pressure indicative signal P. Namely, when the air pressure indicative signal P has a value greater than or equal to a reference value $P_O$, the pump control signal Pu commanding disconnecting of the electromagnetic clutch 13 is output. On the other hand, when the air pressure indicative signal P has smaller value than the reference value $P_O$, the pump control signal Pu commanding engagement of the electromagnetic clutch 13 to drive the air pump 6 is output.

Figure 2:
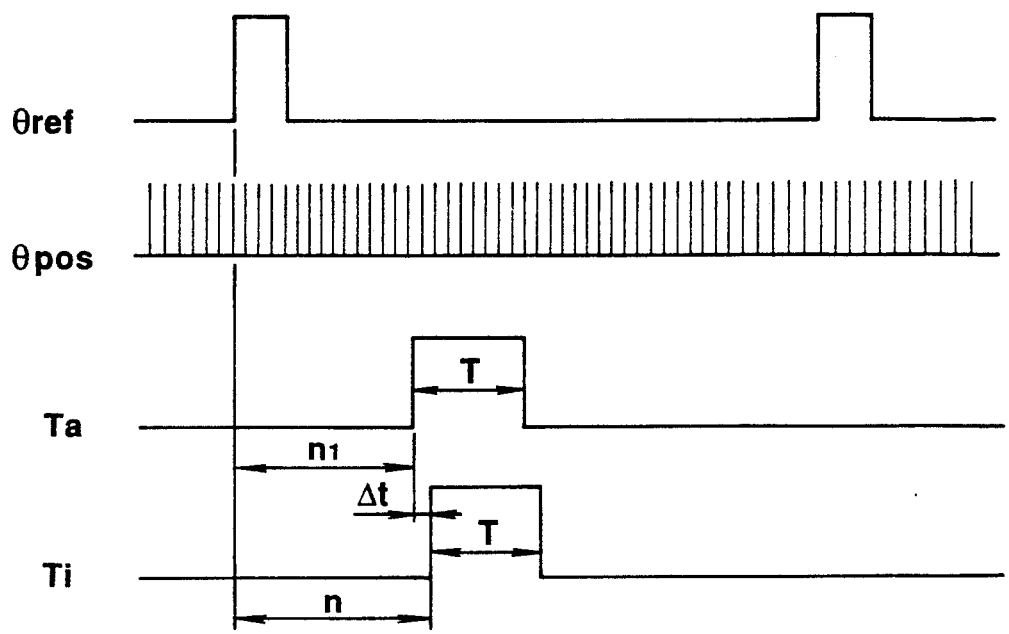
FIG. 2 is a timing chart of signals used in assist air control in the preferred embodiment of the assist air supply system of FIG. 1.

The control unit 18 also derives an assist air supply control signal Ta for controlling open timing of the assist air control valve 10. Basically, the control unit 18 derives the assist air supply control signal Ta so that the assist air is supplied to the air chamber 5 in synchronism with fuel injection. As can be seen from FIG. 2, the open timing of the assist air control valve 10 is set at a timing slightly earlier than open timing of the fuel injection valve 2 in a magnitude of $\Delta t$, in view of possible lag time in the introduction of pressurized air from opening of the assist air control valve 10. Therefore, the advancing magnitude is determined so that pressurized air flows into the air chamber 5 at approximately the same timing as the fuel injection. On the other hand, the duration to maintain the assist air control valve 10 is equal to the fuel injection period T.

In the practical operation, the fuel injection valve open timing is determined with respect to intake valve open timing, so that the fuel injection valve may be closed at a crankshaft angular position at or slightly before a predetermined crankshaft angular position where the intake valve opens. Therefore, the fuel injection valve open timing is variable depending upon duration of fuel injection, as defined by the fuel injection control signal Ti, in a form of a pulse signal which has a pulse width corresponding to the fuel injection duration. Knowing the fuel injection valve close timing, the fuel injection valve open timing is derived on the basis of the fuel injection control signal value Tp. The fuel injection valve opening timing is then described by advance angle n from occurrence of the leading edge of the crank reference signal $\theta_{ref}$. By counting the crank position signal $\theta_{pos}$ from the occurrence of the leading edge of the crank reference signal $\theta_{ref}$, exact timing of outputting the fuel injection pulse can be derived. Since the open timing of the assist air control valve 10 is set earlier than the fuel injection valve open timing in a magnitude of $\Delta t$, a timing to output a pulse signal from assist air supply control signal Ta can be derived by $(n - \Delta t = n_1)$. Therefore, at the advance angle $n_1$ from the occurrence of the leading edge of the crank reference signal $\theta_{ref}$, the assist air supply control signal Ta is output.

The operation of the aforementioned system will be discussed herebelow with reference to FIGS. 3 to 5.

Figure 3:
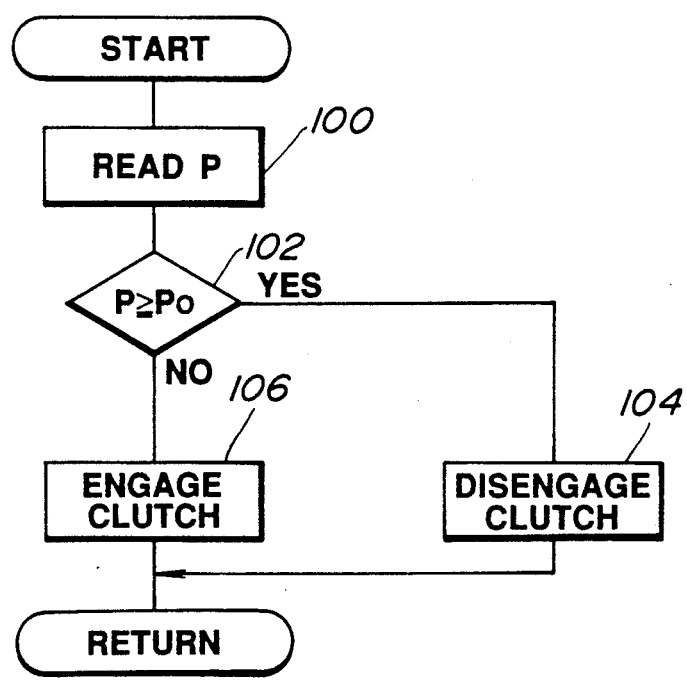
FIG. 3 is a flowchart showing process of control for an assist air pressure source in the assist air supply system of FIG. 1.

FIG. 3 shows a process for adjusting assist air pressure to be supplied to the air chamber 5. The shown routine may be executed cyclically or periodically predetermined regular intervals. Immediately after starting execution, the assist air pressure indicative signal value P is read at a step 100. Then, the assist air pressure indicative signal value P is compared with a predetermined pressure reference value $P_O$ at a step 102. If the assist air pressure indicative signal value P as checked at the step 102 is greater than or equal to the pressure reference value $P_O$, then LOW level pump control signal Pu is output at a step 104 for maintaining the electromagnetic clutch 13 at a disengaged state. On the other hand, when the assist air pressure indicative signal value P is smaller than the pressure reference value $P_O$, then HIGH level pump control signal Pu is output for engaging the electromagnetic clutch 13 thereby transmitting the driving torque of the engine to the air pump 6.

By repeatedly or periodically performing the foregoing process, the assist air pressure is maintained at a level higher than or equal to a predetermined criterion, as represented by the pressure reference value $P_O$. The assist air pressure criterion is determined in relation to a fuel pressure to be supplied to the fuel injection valve and is set at a pressure slightly lower than the fuel pressure. Namely, in the case that the fuel pressure is set at 2.55 kg/cm$^2$, the assist air pressure criterion is set at 2.3 kg/cm$^2$.

Figure 4:
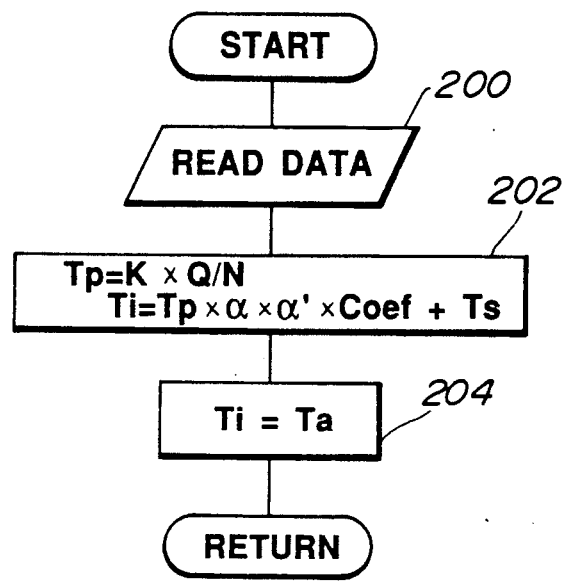
FIG. 4 is a flowchart showing process for determining assist air control valve open timing.

FIG. 4 shows a process of determining duration for maintaining the assist air control valve 10 at open state for supplying assist air to the air chamber 5. Similarly to the above, the shown routine may be triggered periodically. The trigger timing of the shown routine may be determined so as to execute the routine in synchronism with execution timing of a fuel injection control routine. In typical fuel injection control, the fuel injection amount Ti is derived or updated by a time-based trigger routine executed every predetermined interval, e.g. 10 msec. Therefore, the shown routine may be executed at every predetermined intervals, e.g. 10 msec, in synchronism with execution of the fuel injection amount deriving routine.

It should be appreciated though the routine herebelow discussed is formulated as an independent routine from the fuel injection amount deriving routine, it may be possible to formulate the shown routine as a series routine of the fuel injection amount derivation and assist air supply duration derivation.

In the shown routine, various fuel injection control parameters including the engine speed data N and the engine load data Q are read out at a step 200. Based on the read parameter data, arithmetic operation is performed at a step 202 for deriving a fuel injection pulse width Ti which is representative of the amount of fuel to be injected. At a step 204, the assist air control pulse signal duration Ta is determined at a value equal to the fuel injection pulse width Ti.

Figure 5:
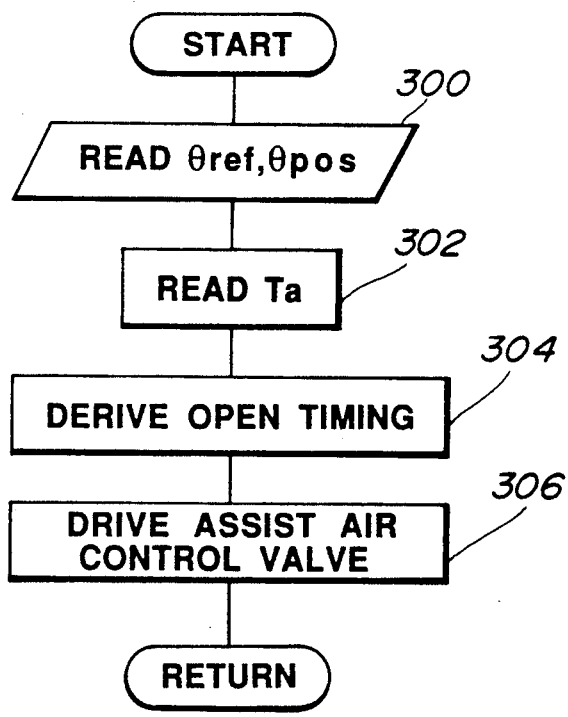
FIG. 5 is a flowchart of process of control for the assist air control valve.

FIG. 5 shows a routine for setting the assist air control valve open timing on the basis of the assist air control pulse duration or, in the alternative, on the basis of the fuel injection pulse width Ti. Namely, as set forth, the fuel injection start timing is determined on the basis of the known fuel injection valve close timing and the fuel injection pulse width. Therefore, the crankshaft angular position at which the leading edge of the fuel injection pulse signal is set, is derived. From the derived crankshaft angular position to open the fuel injection valve, the number n of crank position signal $\theta_{pos}$ to count from the leading edge of the crank reference signal $\theta_{ref}$ is derived. Since the assist air control valve open timing is set earlier than the fuel injection valve open timing in a magnitude of $\Delta t$, the crankshaft angular position at which the assist air control valve opens is determined by subtracting $\Delta t$ from n. As a result, the number $n_1$ of counts of the crank position signal $\theta_{pos}$ from the leading edge of the crank reference signal $\theta_{ref}$ is derived.

In the shown process, the fuel injection valve open timing, determined as set forth above, is read out at a step 300, immediately after starting execution. Then, on the basis of the fuel injection open timing data, the assist valve open timing is derived, so that the assist air control valve may open at earlier timing than the fuel injection valve open timing in a magnitude of $\Delta t$ at a step 302. The assist air control valve open duration Ta, as determined through the process of FIG. 4, is read out at a step 394. At step 306, the crankshaft angular position which is set as the assist air open timing is detected by counting the crank position signal $\theta_{pos}$ after occurrence of the leading edge of the crank reference signal $\theta_{ref}$ to output the assist air control pulse signal for driving the assist air control valve to open.

Utilizing the foregoing system, the assist air pressure can be maintained at substantially uniform level irrespective of the engine driving condition, providing good fuel atomization characteristics over all engine driving ranges. Furthermore, in the shown embodiment, the assist air supply system is as designed as to form swirl flow of the mixture of the atomized fuel and the pressurized air to be introduced into the combustion chamber of the engine. Thus good frame propagation can be obtained for better engine combustion, optimizing the engine efficiency.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is directed to the arrangement wherein the air chamber is defined by the fuel injection valve and the cylindrical cover, so that the assist air is discharged into the air chamber for atomizing the injected fuel and generating swirl flow of the fuel and air, it may be possible to discharge pressurized assist air into the air induction system in the vicinity of the orientation of the fuel injection valve to generate swirl flow within the induction system. Furthermore, though the shown embodiment employs an engine output driven air pump selectively driven by engaging and disengaging the electromagnetic clutch, it may be possible to employ an electrically driven pump irrespective of the engine so that the driving of the pump is solely controlled by controlling power supply for the pump motor.

What is claimed is:

1. An assist air supply system for a fuel injection internal combustion engine comprising:
   an assist air discharge nozzle provided for discharging a pressurized air in the vicinity of a fuel injected through a fuel injection valve;
   a pressurized air supply means including means associated with an external driving power source to be driven by the driving force supplied therefrom, for generating a pressurized air having a pressure level higher than or equal to a predetermined level, and supplying a pressurized air to said assist air discharge nozzle in synchronism with fuel injection;
   sensor means for monitoring preselected engine driving parameters affecting fuel injection amount and producing sensor signals representative of the monitored engine driving parameters; and
   controlling means for receiving said sensor signals and determining assist air supply timing on the basis of said sensor signals so that the assist air is discharged in synchronism with fuel injection timing, said controlling means setting the timing of opening of a valve means so that the valve means opens at an earlier time than an opening time of said fuel injection valve, at a predetermined magnitude.

2. An assist air supply system as set forth in claim 1, wherein said valve means is disposed between said assist air discharge nozzle and said pressurized air source means for selectively establishing and blocking pressurized air communication between said pressurized air source means and said assist air discharge nozzle;
   controlling means for receiving said sensor signals and determining assist air supply timing on the basis of said sensor signals, said controlling means outputting an assist air control signal to said valve means for controlling valve position so that the assist air is discharged in synchronism with fuel injection.

3. An assist air supply system as set forth in claim 3, wherein said controlling means derives a duration to maintain said valve means at open position on the basis of said sensor signals.

4. An assist air supply system as set forth in claim 3, wherein said controlling means sets said duration to maintain the valve means at open position at a magnitude corresponding to a duration, in which the fuel injection valve stays open.

5. An assist air supply system for a fuel injection internal combustion engine comprising:
- an assist air discharge nozzle provided for discharging a pressurized air in the vicinity of a fuel injected through a fuel injection valve;
- a pressurized air supply means including means associated with an external driving power source to be driven by the driving force supplied therefrom, for generating a pressurized air having a pressure level higher than or equal to a predetermined level, and supplying a pressurized air to said assist air discharge nozzle in synchronism with fuel injection;
- a valve means disposed between said assist air discharge nozzle and said pressurized air source means for selectively establishing and blocking pressurized air communication between said pressurized air source means and said assist air discharge nozzle;
- controlling means for receiving said sensor signals and determining assist air supply timing on the basis of said sensor signals, said controlling means for controlling valve position so that the assist air is discharged in synchronism with fuel injection and wherein
- said controlling means derives a duration to maintain said valve means at open position on the basis of said sensor signals;
- said controlling means sets said duration to maintain the valve means at open position at a magnitude corresponding to a duration, in which the fuel injection valve stays open; and
- said controlling means sets a timing of opening said valve means so that the valve means opens at an earlier time than an opening time of said fuel injection valve, at a predetermined magnitude.

6. An assist air supply system as set forth in claim 5, which further comprises sensor means for monitoring preselected engine driving parameters affecting fuel injection amount and producing sensor signals representative of the monitored engine driving parameters; and
- controlling means for receiving said sensor signals and determining assist air supply timing on the basis of said sensor signals so that the assist air is discharged in synchronism with fuel injection timing.

7. An assist air supply system as set forth in claim 6, wherein said controlling means is set at said predetermined magnitude so as to compensate lag time from a timing of opening of said valve means to a timing of discharging assist air.

8. An assist air supply system for a fuel injection internal combustion engine comprising:
- an assist air discharge nozzle provided for discharging a pressurized air in the vicinity of a fuel injected through a fuel injection valve;
- a pressurized air supply means including means associated with an external driving power source to be driven by the driving force supplied therefrom, for generating a pressurized air having a pressure level higher than or equal to a predetermined level, and supplying a pressurized air to said assist air discharge nozzle in synchronism with fuel injection;
- a valve means disposed between said assist air discharge nozzle and said pressurized air source means for selectively establishing and blocking pressurized air communication between said pressurized air source means and said assist air discharge nozzle;
- controlling means for receiving said sensor signals and determining assist air supply timing on the basis of said sensor signals, said controlling means outputting an assist air control signal to said valve means for controlling valve position so that the assist air is discharged in synchronism with fuel injection; and
- which further comprises means for monitoring pressure level of said assist air to be supplied to said assist air discharge nozzle for producing an assist air pressure indicative signal, said controlling means being responsive to said assist air pressure indicative signal for controlling operation of said pressurized air source means so that the assist air pressure is maintained higher than or equal to a predetermined pressure criterion.

9. An assist air supply system as set forth in claim 8, wherein said controlling means is set at said predetermined pressure criterion at a pressure level slightly lower than a fuel pressure level to be supplied to said fuel injection valve.

10. An assist air supply system for a fuel injection internal combustion engine comprising:
- an assist air discharge nozzle provided, for discharging a pressurized air in the vicinity of a fuel injected through a fuel injection valve;
- a pressurized air supply means including means associated with an external driving power source to be driven by the driving force supplied therefrom, for generating a pressurized air having a pressure level higher than or equal to a predetermined level, and supplying a pressurized air to said assist air discharge nozzle in synchronism with fuel injection;
- wherein said pressurized air source means comprises an engine powered air pump connected to an engine output shaft via an electromagnetic clutch means which selectively engages and disengages for driving and stopping said pump, and said controlling means controls said electromagnetic clutch at the engaged state when the pressure level of said assist air to be supplied to said assist air discharge nozzle is lower than a predetermined pressure criterion.

11. An assist air supply system for a fuel injection internal combustion engine comprising:
- an assist air discharge nozzle provided for discharging a pressurized air in the vicinity of a fuel injected through a fuel injection valve; and
- a pressurized air supply means including means associated with an external driving power source to be driven by the driving force supplied therefrom, for generating a pressurized air having a pressure level higher than or equal to a predetermined level, and supplying a pressurized air to said assist air discharge nozzle in synchronism with fuel injection; and
- means for defining an air chamber surrounding discharge outlet of said fuel injection valve, wherein said assist air supply nozzle is inserted into said air chamber for discharging pressurized assist air into said air chamber for generating swirl flow of atomized fuel and pressurized air to be introduced into a combustion chamber of the engine.

12. An assist air supply system for a fuel injection internal combustion engine comprising:
an assist air discharge nozzle provided for discharging a pressurized air in the vicinity of a fuel injected through a fuel injection valve;
a pressurized air source means including a pump means for generating a pressurized air at a level of pressure higher than or equal to a predetermined level, and supplying a pressurized air to said assist air discharge nozzle;
a valve means disposed between said assist air discharge nozzle and said pressurized air source means for selectively establishing and blocking pressurized air communication between said pressurized air source means and said assist air discharge nozzle;
sensor means for monitoring preselected engine driving parameters affecting fuel injection amount and producing sensor signals representative of the monitored engine driving parameters; and
controlling means for receiving said sensor signals and determining assist air supply timing on the basis of said sensor signals, said controlling means outputting an assist air control signal to said valve means for controlling valve position so that the assist air is discharged in synchronism with fuel injection, said controlling means setting the timing of opening of said valve means so that the valve means opens at an earlier time than an opening time of said fuel injection valve, at a predetermined magnitude.

13. An assist air supply system as set forth in claim 12, wherein said controlling means derives a duration to maintain said valve means at open position on the basis of said sensor signals.

14. An assist air supply system as set forth in claim 13, wherein said controlling means sets said duration to maintain the valve means at open position at a magnitude corresponding to a duration, in which the fuel injection valve stays open.

15. An assist air supply system for a fuel injection internal combustion engine comprising:
an assist air discharge nozzle provided for discharging a pressurized air in the vicinity of a fuel injected through a fuel injection valve;
a pressurized air source means including a pump means for generating a pressurized air at a level of pressure higher than or equal to a predetermined level, and supplying a pressurized air to said assist air discharge nozzle;
a valve means disposed between said assist air discharge nozzle and said pressurized air source means for selectively establishing and blocking pressurized air communication between said pressurized air source means and said assist air discharge nozzle;
sensor means for monitoring preselected engine driving parameters affecting fuel injection amount and producing sensor signals representative of the monitored engine driving parameters;
controlling mean for receiving said sensor signals and determining assist air supply timing on the basis of said sensor signals, said controlling means outputting an assist air control signal to said valve means for controlling valve position so that the assist air is discharged in synchronism with fuel injection and wherein
said controlling means derives a duration to maintain said valve means at open position on the basis of said sensor signals,
said controlling means sets said duration to maintain the valve means at open position at a magnitude corresponding to a duration, in which the fuel injection valve stays open, and
said controlling means sets a timing of opening said valve means so that the valve means opens at an earlier time than an opening time of said fuel injection valve, at a predetermined magnitude.

16. An assist air supply system as set forth in claim 15, wherein said controlling means is set said predetermined magnitude so as to compensate lag time from timing of opening of said valve means to a timing of discharging assist air.

17. An assist air supply system for a fuel injection internal combustion engine comprising:
an assist air discharge nozzle provided for discharging a pressurized air in the vicinity of a fuel injected through a fuel injection valve;
a pressurized air source means including a pump means for generating a pressurized air at a level of pressure higher than or equal to a predetermined level, and supplying a pressurized air to said assist air discharge nozzle;
a valve means disposed between said assist air discharge nozzle and said pressurized air source means for selectively establishing and blocking pressurized air communication between said pressurized air source means and said assist air discharge nozzle;
sensor means for monitoring preselected engine driving parameters affecting fuel injection amount and producing sensor signals representative of the monitored engine driving parameters; and
controlling means for receiving said sensor signals and determining assist air supply timing on the basis of said sensor signals, said controlling means outputting an assist air control signal to said valve means for controlling valve position so that the assist air is discharged in synchronism with fuel injection and
means for monitoring pressure level of said assist air to be supplied to said assist air discharge nozzle for producing an assist air pressure indicative signal, wherein said controlling means is responsive to said assist air pressure indicative signal for controlling operation of said pressurized air source means so that the assist air pressure is maintained higher than or equal to a predetermined pressure criterion.

18. An assist air supply system as set forth in claim 17, wherein said controlling means is set said predetermined pressure criterion at a pressure level slightly lower than a fuel pressure level to be supplied to said fuel injection valve.

19. An assist air supply system for a fuel injection internal combustion engine comprising;
an assist air discharge nozzle provided for discharging a pressurized air in the vicinity of a fuel injected through a fuel injection valve;
a pressurized air source means including a pump means for generating a pressurized air at a level of pressure higher than or equal to a predetermined level, and supplying a pressurized air to said assist air discharge nozzle;

a valve means disposed between said assist air discharge nozzle and said pressurized air source means for selectively establishing and blocking pressurized air communication between said pressurized air source means and said assist air discharge nozzle;

sensor means for monitoring preselected engine driving parameters affecting fuel injection amount and producing sensor signals representative of the monitored engine driving parameters; and controlling means for receiving said sensor signals and determining assist air supply timing on the basis of said sensor signals, said controlling means outputting an assist air control signal to said valve means for controlling valve position so that the assist air is discharged in synchronism with fuel injection, wherein said pressurized air source means comprises an engine powered air pump connected to an engine output shaft via an electromagnetic clutch means which selectively engages and disengages for driving and stopping said pump, and said controlling means controls said electromagnetic clutch at the engaged state when the pressure level of said assist air to be supplied to said assist air discharge nozzle is lower that a predetermined pressure criterion.

20. An assist air supply system for a fuel injection internal combustion engine comprising:

an assist air discharge nozzle provided for discharging a pressurized air in the vicinity of a fuel injected through a fuel injection valve;

a pressurized air source means including a pump means for generating a pressurized air at a level of pressure higher or equal to a predetermined level, and supplying a pressurized air to said assist air discharge nozzle;

a valve means disposed between said assist air discharge nozzle and said pressurized air source means for selectively establishing and blocking pressurized air communication between said pressurized air source means and said assist air discharge nozzle;

sensor means for monitoring preselected engine driving parameters affecting fuel injection amount and producing sensor signals representative of the monitored engine driving parameters;

controlling means for receiving said sensor signals and determining assist air supply timing on the basis of said sensor signals, said controlling means outputting an assist air control signal to said valve means for controlling valve position so that the assist air is discharged in synchronism with fuel injection, and means for defining an air chamber surrounding discharge outlet of said fuel injection valve, wherein said assist air supply nozzle is inserted into said air chamber for discharging pressurized assist air into said air chamber for generating swirl flow of atomized fuel and pressurized air to be introduced into a combustion chamber of the engine.

* * * * *